United States Patent
Hu

(10) Patent No.: US 8,652,650 B2
(45) Date of Patent: Feb. 18, 2014

(54) PLATINUM-MODIFIED NICKEL-BASED SUPERALLOYS, METHODS OF REPAIRING TURBINE ENGINE COMPONENTS, AND TURBINE ENGINE COMPONENTS

(75) Inventor: Yiping Hu, Greer, SC (US)

(73) Assignee: Honeywell International Inc., Morristown, NJ (US)

( * ) Notice: Subject to any disclaimer, the term of this patent is extended or adjusted under 35 U.S.C. 154(b) by 835 days.

(21) Appl. No.: 12/604,130

(22) Filed: Oct. 22, 2009

(65) Prior Publication Data

US 2011/0097599 A1  Apr. 28, 2011

(51) Int. Cl.
*B32B 15/01* (2006.01)
*B23P 6/04* (2006.01)
*C22C 19/03* (2006.01)

(52) U.S. Cl.
USPC ........... 428/680; 420/442; 420/445; 420/460; 29/889.1; 416/241 R

(58) Field of Classification Search
None
See application file for complete search history.

(56) References Cited

U.S. PATENT DOCUMENTS

| 3,854,941 | A | * | 12/1974 | Morrow et al. | 420/445 |
|---|---|---|---|---|---|
| 4,818,486 | A | * | 4/1989 | Rothman et al. | 420/442 |
| 4,885,216 | A | * | 12/1989 | Naik | 428/680 |
| 5,077,141 | A | | 12/1991 | Naik et al. | |
| 5,395,584 | A | | 3/1995 | Berger et al. | |
| 5,582,635 | A | * | 12/1996 | Czech et al. | 106/14.05 |
| 5,890,274 | A | * | 4/1999 | Clement et al. | 29/527.2 |
| 6,027,584 | A | | 2/2000 | Jackson et al. | |
| 6,177,046 | B1 | | 1/2001 | Simkovich et al. | |
| 6,302,649 | B1 | | 10/2001 | Mukira et al. | |
| 6,365,285 | B1 | | 4/2002 | Chesnes | |
| 6,696,176 | B2 | | 2/2004 | Allen et al. | |
| 6,908,288 | B2 | | 6/2005 | Jackson et al. | |
| 7,250,081 | B2 | | 7/2007 | Hu et al. | |
| 7,547,188 | B2 | | 6/2009 | Imano et al. | |
| 7,587,818 | B2 | | 9/2009 | Gorman et al. | |

FOREIGN PATENT DOCUMENTS

EP       0194391 A1 *  9/1986  .............. C23C 30/00

* cited by examiner

*Primary Examiner* — David Sample
*Assistant Examiner* — Adam Krupicka
(74) *Attorney, Agent, or Firm* — Ingrassia Fisher & Lorenz, P.C.

(57) ABSTRACT

Platinum-modified nickel-based superalloys and turbine engine components are provided. The platinum-modified nickel-based superalloy includes, by weight, aluminum, in a range of about 7.8 percent to about 8.2 percent, tantalum, in a range of about 5.0 percent to about 6.0 percent, rhenium, in a range of about 1.6 percent to about 2.0 percent, platinum, in a range of about 0.8 percent to about 1.4 percent, hafnium, in a range of about 0.20 percent to about 0.40 percent, silicon, in a range of about 0.30 percent to about 0.60 percent, about 0.02 percent carbon, about 0.01 percent boron, and a balance of nickel. The platinum-modified a nickel-based superalloy may also include, by weight, chromium in a range of about 4.0 percent to about 5.0 percent.

20 Claims, 3 Drawing Sheets

PLATINUM-MODIFIED NICKEL-BASED SUPERALLOYS, METHODS OF REPAIRING TURBINE ENGINE COMPONENTS, AND TURBINE ENGINE COMPONENTS

TECHNICAL FIELD

The inventive subject matter generally relates to turbine engine components and more particularly relates to platinum-modified nickel-based superalloys and methods for repairing the components.

BACKGROUND

Turbine engines are used as the primary power source for various kinds of aircrafts. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Turbine engines are also used to drive one or more propellers, electrical generators, or other devices.

Turbine engine blades and vanes are fabricated from high temperature materials such as nickel-based and/or cobalt-based superalloys. Although nickel-based and cobalt-based superalloys have good high temperature properties and many other advantages, they are susceptible to corrosion, oxidation, thermal fatigue, and erosion damage in the harsh environment of an operating turbine engine. These limitations are problematic as there is a constant drive to increase engine operating temperatures in order to increase fuel efficiency and to reduce emission. Replacing damaged turbine engine components made from advanced nickel-based superalloys is expensive, and significant research is being performed to find cost-effective ways to repair these components.

Hence, there is a need for methods and materials for repairing turbine engine components such as the turbine blades and vanes. There is a particular need for environment-resistant repair materials that will improve a turbine engine component's durability, and for efficient and cost effective methods of repairing the components using such materials. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Platinum-modified nickel-based superalloys, method of repairing turbine engine components, and turbine engine components are provided.

In an embodiment, by way of example only, a platinum-modified nickel-based superalloy includes, by weight, aluminum, in a range of about 7.8 percent to about 8.2 percent, tantalum, in a range of about 5.0 percent to about 6.0 percent, rhenium, in a range of about 1.6 percent to about 2.0 percent, platinum, in a range of about 0.8 percent to about 1.4 percent, hafnium, in a range of about 0.20 percent to about 0.40 percent, silicon, in a range of about 0.30 percent to about 0.60 percent, about 0.02 percent carbon, about 0.01 percent boron, and a balance of nickel.

In another embodiment, by way of example only, a method of repairing a turbine engine component includes applying a platinum-modified nickel-based superalloy onto a portion of the turbine engine component to form a welded portion, the platinum-modified nickel-based superalloy comprising, by weight aluminum, in a range of about 7.8 percent to about 8.2 percent, tantalum, in a range of about 5.0 percent to about 6.0 percent, rhenium, in a range of about 1.6 percent to about 2.0 percent, platinum, in a range of about 0.8 percent to about 1.4 percent, hafnium, in a range of about 0.20 percent to about 0.40 percent, silicon, in a range of about 0.30 percent to about 0.60 percent, about 0.02 percent carbon, about 0.01 percent boron, about 50 parts per million of yttrium, about 50 parts per million of lanthanum, and a balance of nickel, and performing a post-deposition step on the turbine engine component.

In still another embodiment, by way of example only, a turbine engine component includes a substrate comprising a first alloy and a welded portion on the substrate, the welded portion produced/deposited with a second alloy comprising, by weight about aluminum, in a range of about 7.8 percent to about 8.2 percent, tantalum, in a range of about 5.0 percent to about 6.0 percent, rhenium, in a range of about 1.6 percent to about 2.0 percent, platinum, in a range of about 0.8 percent to about 1.4 percent, hafnium, in a range of about 0.20 percent to about 0.40 percent, silicon, in a range of about 0.30 percent to about 0.60 percent, about 0.02 percent carbon, about 0.01 percent boron, and a balance of nickel.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

An improved, nickel-based superalloy composition is provided that may have superior elevated-temperature properties over those of conventional superalloys. In an embodiment, the inclusion of certain elements, such as aluminum, silicon, and, in some embodiments, chromium, improves oxidation resistance when the improved, nickel-based superalloy is exposed to engine operating temperatures, such as turbine inlet temperatures greater than about 2200° F. (1205° C.). In an example, the improved, nickel-based superalloy composition may improve resistance to erosion or materials loss due to corrosion, oxidation, thermal fatigue, and other hazards when used for the repair of high pressure turbine (HPT) components such as turbine blades and vanes.

Figure 1:
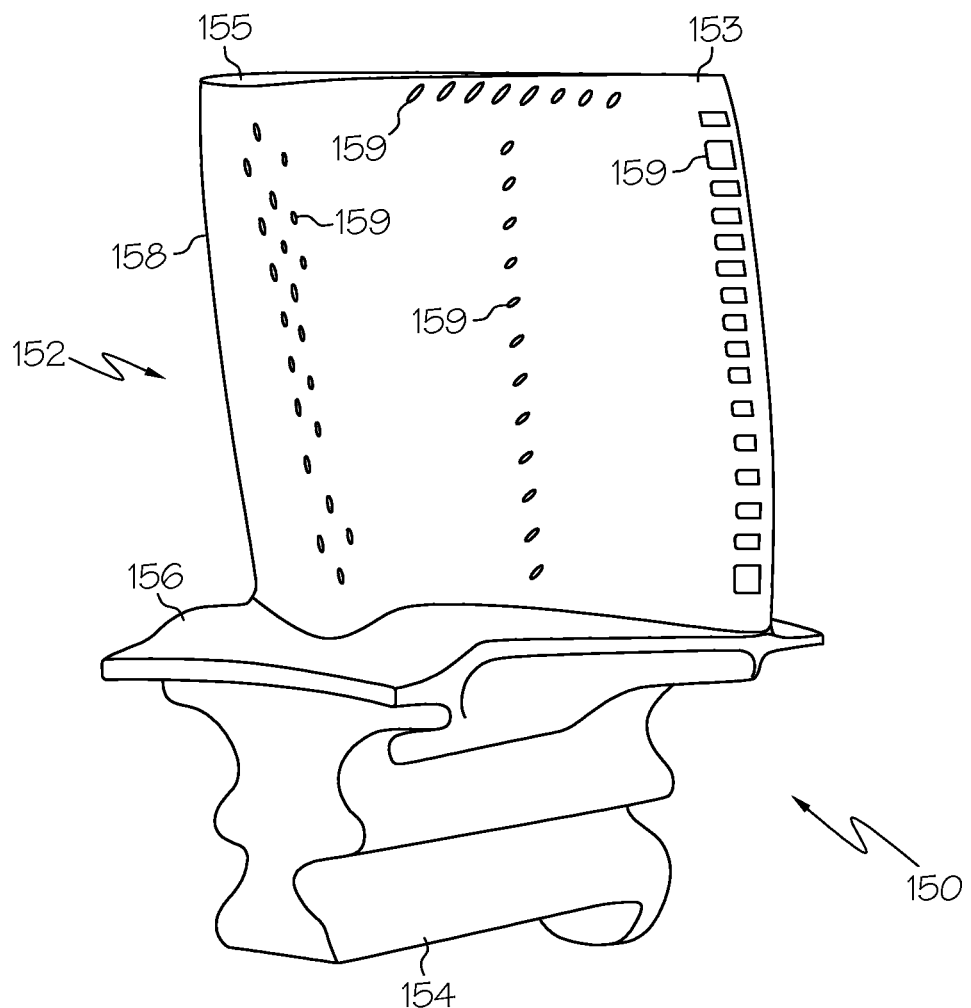
FIG. 1 is a perspective view of a repaired turbine engine component, according to an embodiment.

FIG. 1 is a perspective view of a repaired turbine engine component 150, according to an embodiment. Here, the repaired turbine engine component 150 is shown as a turbine blade. However, in other embodiments, the repaired turbine engine component 150 may be a turbine vane or other component that may be implemented in a gas turbine engine, or other high-temperature system. In an embodiment, the repaired turbine engine component 150 may include an airfoil 152 that includes a pressure side surface 153, an attachment portion 154, a leading edge 158 including a blade tip 155, and/or a platform 156. In accordance with an embodiment, the repaired turbine engine component 150 may be formed with a non-illustrated outer shroud attached to the tip 155. The repaired turbine engine component 150 may have non-illustrated internal air-cooling passages that remove heat from the turbine airfoil. After the internal air has absorbed heat from the blade, the air is discharged into a hot gas flow path through passages 159 in the airfoil wall. Although the repaired turbine engine component 150 is illustrated as including certain parts and having a particular shape and dimension, different shapes, dimensions and sizes may be alternatively employed depending on particular gas turbine engine models and particular applications.

Figure 2:
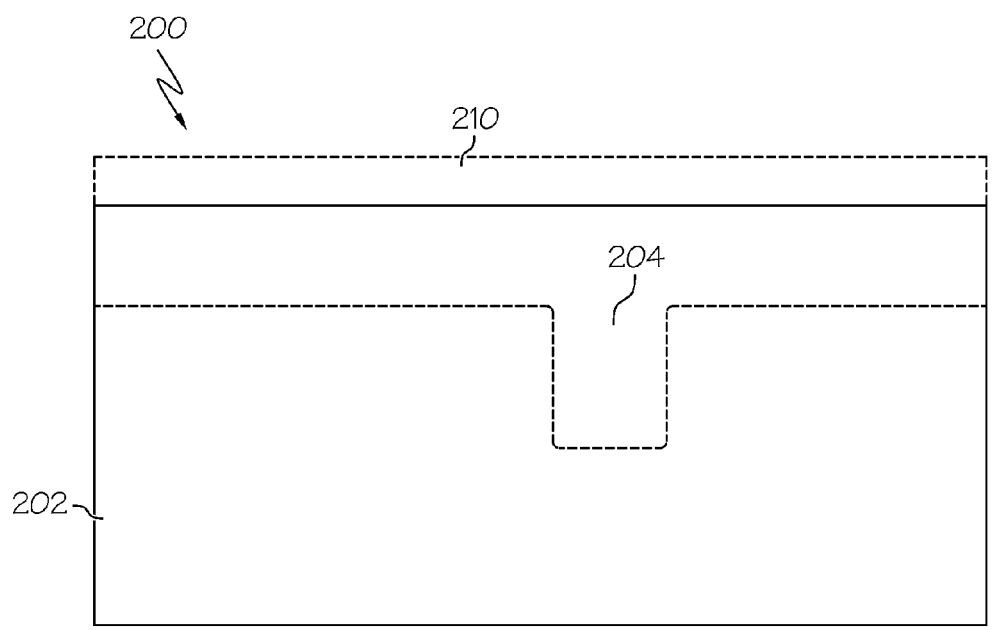
FIG. 2 is a front view of a portion of a repaired turbine engine component, according to an embodiment.

FIG. 2 is a front view of a portion of a repaired turbine engine component 200, according to an embodiment. The portion may be included on one or more of a leading edge, trailing edge, or tip of a blade, in an embodiment. In another embodiment in which the blade is implemented in a knife seal, the portion may be included as an edge of the blade defining the knife seal. In any case, the repaired turbine engine component 200 may include a base material 202 and a restored portion 204 over at least a portion thereof. Though a dotted line is shown between the base material 202 and the restored portion 204, it will be appreciated that in an embodiment, the two may be seamless and metallurgical bonding or a metallurgical interface therebetween may be produced during welding repair. In some embodiments, as shown in phantom, a protective coating system 210 may be deposited over the turbine engine component 200.

In an embodiment, the base material 202 comprises a first nickel-based superalloy. For example, the first nickel-based superalloy may be selected from a high performance nickel-based superalloy, including, but not limited to IN792, C101, MarM247, Rene80, Rene125, ReneN5, SC180, CMSX 4, and PWA1484. In other embodiments, the base material 202 may comprise a cobalt-based superalloy or another superalloy conventionally employed for the fabrication of turbine engine components.

The restored portion 204 may include a repair of a wedge crack extending below a tip cap and/or a build-up of a tip surface over the base material 202. In this regard, the restored portion 204 includes a second nickel-based superalloy used as a weld repair alloy. The second nickel-based superalloy has a composition that is different than the composition of the first nickel-based superalloy. In an embodiment, the second nickel-based superalloy is a platinum-modified nickel-based superalloy having oxidation-resistance properties that are greatly improved over those of the first nickel-based superalloy. The platinum-modified nickel-based superalloy includes elements selected from nickel, aluminum, tantalum, rhenium, platinum, hafnium, silicon, carbon, boron, yttrium, lanthanum, and chromium. In yet another embodiment, the platinum-modified nickel-based superalloys may not include some refractory elements which negatively affect oxidation performance of the weld repair alloy. For example, the platinum-modified nickel-based superalloy does not include one or more of molybdenum, tungsten, and cobalt.

In an embodiment, a first formulation of the platinum-modified nickel-based superalloy may include, by weight, aluminum in a range of about 7.8 percent to about 8.2 percent, tantalum in a range of about 5.0 percent to about 6.0 percent, rhenium in a range of about 1.6 percent to 2.0 percent, platinum in a range of about 0.8 percent to 1.4 percent, hafnium in a range of about 0.20 percent to about 0.40 percent, silicon in a range of about 0.30 percent to about 0.60 percent, about 0.02 percent carbon, and about 0.01 percent boron. In another embodiment of the first formulation, the platinum-modified nickel-based superalloy further may include, by weight, about 50 parts per million of yttrium. In still another embodiment of the first formulation, the platinum-modified nickel-based superalloy also may include, by weight, about 50 parts per million of lanthanum. In still yet another embodiment, a second formulation of the platinum-modified nickel-based superalloy may include, by weight, chromium in a range of about 4.0 percent to 5.0 percent, aluminum in a range of about 7.8 percent to 8.2 percent, tantalum in range of about 5.0 percent to about 6.0 percent, rhenium in a range of about 1.6 percent to 2.0 percent, platinum in a range of about 0.8 percent to 1.4 percent, hafnium in a range of about 0.20 percent to about 0.40 hafnium, silicon in a range of about 0.30 percent to about 0.60 percent, about 0.02 percent carbon, and about 0.01 percent boron. In another embodiment of the second formulation, the platinum-modified nickel-based superalloy further may include, by weight, about 50 parts per million of yttrium. In still another embodiment of the second formulation, the platinum-modified nickel-based superalloy further may include, by weight, about 50 parts per of million lanthanum.

Inclusion of a greater percentage of aluminum in the platinum-modified nickel-based superalloy as compared with conventional nickel-based superalloys promotes formation of a protective oxide scale on a surface of the welded portion (e.g., blade tip 206). The protective oxide scale protects the outer surface of the welded portion (e.g., blade tip 206) against oxidation. Silicon in the platinum-modified nickel-based superalloy reacts with oxygen to form silica, which may also contribute to the oxidation-resistant improvement of the protective oxide scale. Platinum and the included reactive elements (e.g., hafnium, yttrium, and lanthanum) may improve adhesion of the protective oxide scale to the blade tip 206. Specifically, the hafnium atoms of the platinum-modified nickel-based superalloy diffuse into grain boundaries of the aluminum oxides in the scale to decrease a rate at which the protective oxide scale grows on the welded portion (e.g., blade tip 206) so that the protective oxide scale remains relatively thin. As a result, spallation of the protective oxide scale may be minimized. Moreover, yttrium, lanthanum, and/or other reactive elements may be included in the composition of the platinum-modified nickel-based superalloy to tie up the sulfur that may be present in the nickel-based superalloy 202 when exposed to operating gases or when a platinum aluminide coating is formed over the nickel-based superalloy of the base material 202. Specifically, yttrium, lanthanum, and/or other reactive elements may react with sulfur to form stable sulfides to prevent the sulfur from diffusing to the surface of the superalloy. This may also improve the adherence of a protective thin layer of alumina scale to the alloy.

The element tantalum may partition into gamma prime phase to improve the elevated-temperature properties of the platinum-modified nickel-based superalloy. Rhenium may be included to partition to the gamma matrix of the material to enhance a negative lattice misfit between the gamma matrix and gamma prime phases, which may improve creep resistance of the material. Rhenium may also prevent gamma prime particles from coarsening, which may greatly improve the elevated-temperature properties of the alloy. Carbon and boron are included to strengthen grain boundaries in the restored portion 204.

In an embodiment in which increased oxidation-resistance is desired, the platinum-modified nickel-based superalloy may further include chromium, as noted above. By including in a range about 4.0 to about 5.0 percent, by weight, of chromium, the chromium may contribute to the formation of a chromium oxide scale over the welded portion (e.g., blade tip 206).

Figure 3:
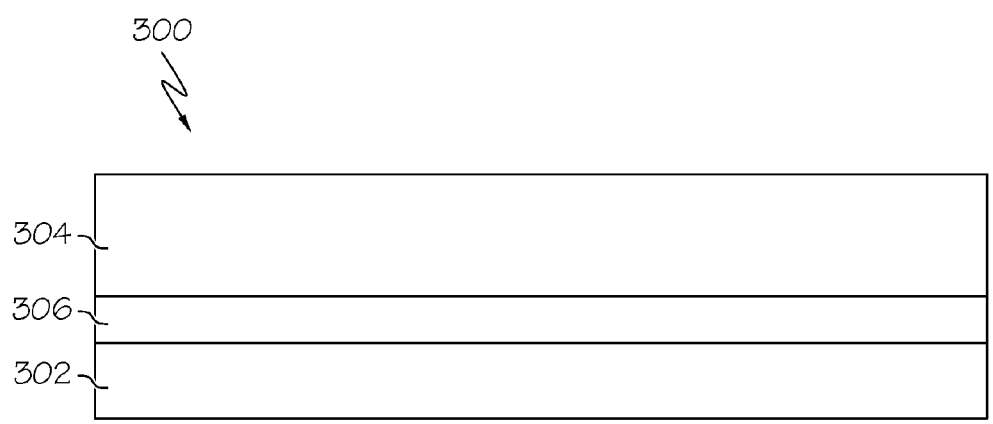
FIG. 3 is a cross-sectional view of a protective coating system that may be included over a turbine engine component, according to an embodiment.

To further protect the turbine engine component 200 which may be exposed to the harsh operating temperatures, the protective coating system 210 may be included, in an embodiment. FIG. 3 is a cross-sectional view of a protective coating system 300 that may be included over a turbine engine component, according to an embodiment. The protective coating system 300 may include a bond coating 302, a thermal barrier coating 304, and one or more intermediate layers therebetween, such as a thermally grown oxide (TGO) 306. In one embodiment, the bond coating 302 may be a diffusion aluminide coating. For example, the diffusion aluminide coating may be formed by depositing an aluminum layer over the base material 202 (FIG. 2) and/or the restored portion 204 (FIG. 2), and subsequently interdiffusing the aluminum layer with the substrate to form the diffusion aluminide coating. According to one embodiment, the diffusion aluminide coating is a simple diffusion aluminide, including a single layer made up of aluminum interacting with the base material 202 and/or the restored portion 204. In another embodiment, the diffusion aluminide coating may have a more complex structure and may include one or more additional metallic layers that are diffused into the aluminum layer, the base material 202, and/or the restored portion 204. For example, an additional metallic layer may include a platinum layer, a hafnium and/or a zirconium layer, or a co-deposited hafnium, zirconium, and platinum layer.

In another embodiment, the bond coating 302 may be an overlay coating comprising MCrAlX, wherein M is an element selected from cobalt, nickel, or combinations thereof, and X is an element selected from hafnium, zirconium, yttrium, tantalum, rhenium, ruthenium, palladium, platinum, silicon, or combinations thereof. Some examples of MCrAlX compositions include NiCoCrAlY and CoNiCrAlY. In still another embodiment, the bond coating 302 may include a combination of two types of bond coatings, such as a diffusion aluminide coating formed on a MCrAlX coating. In any case, the bond coating 302 may have a thickness in a range of from about 25 microns ($\mu m$) to about 150 $\mu m$, according to an embodiment. In other embodiments, the thickness of the bond coating 302 may be greater or less.

The thermal barrier coating 304 may be formed over the bond coating 302 and may comprise, for example, a ceramic. In one example, the thermal barrier coating 304 may comprise a partially stabilized zirconia-based thermal barrier coating, such as yttria stabilized zirconia (YSZ). In an embodiment, the thermal barrier coating may comprise yttria stabilized zirconia doped with other oxides, such as $Gd_2O_3$, $TiO_2$, and the like. In another embodiment, the thermal barrier coating 304 may have a thickness that may vary and may be, for example, in a range from about 50 $\mu m$ to about 300 $\mu m$. In other embodiments, the thickness of the thermal barrier coating 304 may be in a range of from about 100 $\mu m$ to about 250 $\mu m$. In still other embodiments, the thermal barrier coating 304 may be thicker or thinner than the aforementioned ranges.

The thermally-grown oxide layer 306 may be located between the bond coating 302 and the thermal barrier coating 304. In an embodiment, the thermally-grown oxide layer 306 may be grown from aluminum in the above-mentioned materials that form the bond coating 302. For example, during pre-heating and/or depositing of the thermal barrier coating 304 on a turbine component with the bond coating 302, oxidation may occur on the bond coating 302 to result in the formation of the oxide layer 306. In one embodiment, the thermally-grown oxide layer 306 may be relatively thin, and may be less than 5 $\mu m$ thick.

Figure 4:
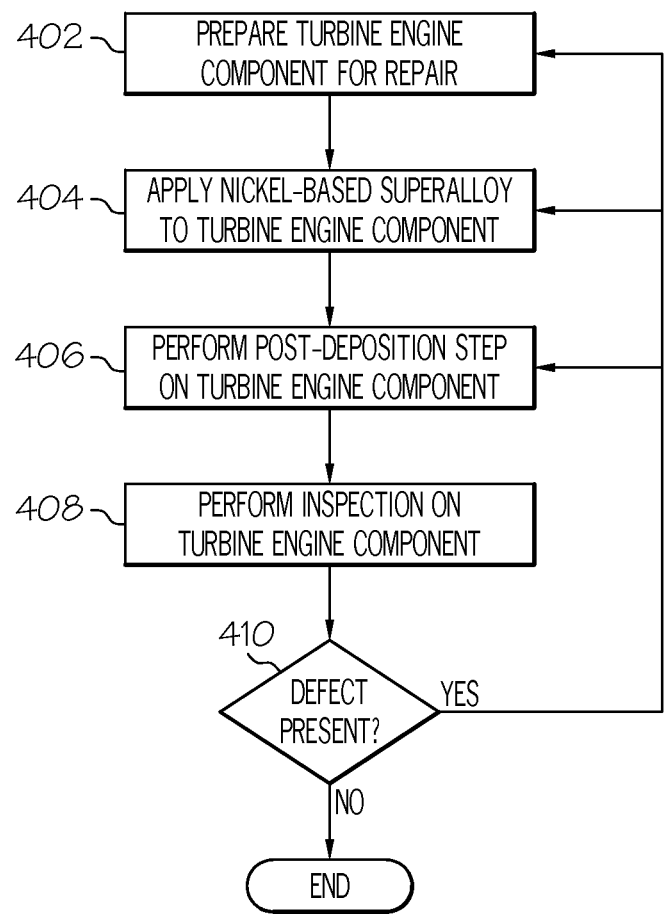
FIG. 4 is flow diagram of a method of repairing a turbine engine component, according to an embodiment.

To repair a degraded turbine engine component, a method 400, depicted in a flow diagram provided in FIG. 4, may be employed. Although the following method 400 is described with reference to repair of a turbine blade, it should be understood that the method 400 is not limited to blades or any other particular components. According to an embodiment, the turbine engine component is prepared for repair, step 402. In an embodiment, the turbine engine HPT airfoils may be inspected to identify one or more worn or damaged turbine engine components, such as damaged turbine blades, on a turbine rotor, and detaching the worn or damaged turbine engine components from the turbine rotor. In an embodiment, step 402 may include chemically preparing the surface of the turbine engine component at least in proximity to and/or on surfaces defining the structural feature. For example, in an embodiment in which the turbine engine component includes an outer environment-protection coating, the coating may be removed. Thus, a chemical stripping solution may be applied to a surface of the turbine engine component, such as the surfaces and portions of the component surrounding and/or defining the structural feature. Suitable chemicals used to strip the coating may include, for example, nitric acid solution. However, other chemicals may alternatively be used, depending on a particular composition of the coating.

In another embodiment of step 402, the turbine engine component may be mechanically prepared. Examples of mechanical preparation include, for example, pre-repair machining and/or degreasing surfaces in proximity to and/or defining the structural feature in order to remove any oxidation, dirt or other contaminants. In another embodiment, additional or different types and numbers of preparatory steps can be performed. It will be appreciated that the present embodiment is not limited to these preparatory steps, and that additional, or different types and numbers of preparatory steps can be conducted.

Once the turbine engine component has been prepared, a platinum-modified nickel-based superalloy may be applied thereto, step 404. In an embodiment, the platinum-modified nickel-based superalloy may be laser-welded onto the worn or damaged area. In an example, the platinum-modified nickel-based superalloy may comprise any one of the above-described superalloy compositions used for a restored portion (e.g., restored portion 204 in FIG. 2) of a turbine blade. The platinum-modified nickel-based superalloy may be provided as substantially spherical powder particles, which provide improved powder flow property and may help maintain a stable powder feed rate during the welding process. According to an embodiment, the spherical powder particles may have an average diameter in a range of about 45 $\mu m$ to about 150 $\mu m$. In other embodiments, the average diameters may be smaller or greater than the aforementioned range.

The platinum-modified nickel-based superalloy powder may be used in conjunction with a $CO_2$ laser, a YAG laser, a diode laser, or a fiber laser welding system. In an embodiment, a welding process includes laser powder fusion welding, in which the nickel-based superalloy is laser deposited onto a degraded area to restore both geometry and dimension with metallurgically sound buildup. Both automatic and manual laser welding systems are widely used to perform laser powder fusion welding processes. An exemplary welding repair is described in detail in U.S. Pat. No. 7,250,081 B2 entitled "Methods For Repair Of Single Crystal Superalloys By Laser Welding And Products Thereof" and incorporated herein by reference.

In another embodiment, applying the platinum-modified nickel-based superalloy to the worn or damaged area may include plasma transfer arc (PTA), micro plasma, and tungsten inert gas (TIG) welding methods. In still other embodiments, the step of applying the nickel-based superalloy may include performing a thermal spray process such as high velocity oxygen fuel (HVOF) or low pressure plasma spraying (LPPS) method.

In still yet another embodiment, applying the platinum-modified nickel-based superalloy may include performing a cold gas-dynamic spraying. In this process, a cold spray system mixes particles of the platinum-modified nickel-based superalloy with a suitable pressurized gas in a mixing chamber. The particles are then accelerated through the specially designed nozzle and directed toward a target surface on the turbine engine component. When the particles strike the target surface, the kinetic energy of the particles is converted into plastic deformation of the particle, causing the particle to form a strong bond with the target surface and produce a coating. In this method, the particles are applied and deposited in the solid state, i.e., at a temperature which is considerably lower than the melting point of the powder material.

Returning to the flow diagram of FIG. 4, after the application step 404 is completed, at least one post-deposition step is performed on the turbine engine component, step 406. A particular post-deposition step may depend on the type of application process that was performed in step 404. For example, if a spraying process was performed to repair the turbine blade, then the post-deposition step may include a hot isostatic pressing (HIP) process performed for about four hours at 2200° F. (about 1205° C.) with an applied pressure of 15 ksi. In another embodiment, the post-deposition step 406 can further include additional processes that improve the mechanical properties and metallurgical integrity of the turbine engine component. Such processes may include final machining the repaired turbine engine component to a predetermined or original design dimension. Other processes include re-coating the repaired turbine engine component with a suitable coating material such as environment-resistant diffusion aluminide and/or MCrAlY overlay coatings, coating diffusion, and aging heat treatments to homogenize microstructures and improve performance of the repaired turbine airfoils.

After the post-deposition step 406 is completed, at least one inspection process can be performed, step 408. In an embodiment, the inspection process may be employed to determine whether any surface defects exist, such as cracks or other openings, step 410. The inspection process may be conducted using any well-known non-destructive inspection techniques including, but not limited to, a fluorescent penetration inspection, and a radiographic inspection. If an inspection process indicates that a surface defect exists, the turbine blade is subjected to an additional repair process, and the process may return to either steps 402, 404, or 406. If an inspection process indicates that a surface defect does not exist, the process ends and the repaired turbine engine component may be ready to be implemented into a turbine engine or other system.

A novel nickel-based superalloy (e.g., the platinum-modified nickel-based superalloy) and an improved method for repairing turbine engine components have now been provided. The novel nickel-based superalloy may provide improved oxidation-resistance over conventional nickel-based superalloys when subjected to harsh engine operating temperatures. Additionally, the repair methods in which the novel nickel-based superalloys are used may be employed not only on blades, but also on other turbine engine components, including, but not limited to, vanes and shrouds. The repair method may also improve the durability of the turbine engine component, thereby optimizing the operating efficiency of a turbine engine, and prolonging the operational life of turbine blades and other engine components.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A platinum-modified nickel-based superalloy comprising, by weight:
   aluminum, in a range of about 7.8 percent to about 8.2 percent;
   tantalum, in a range of about 5.0 percent to about 6.0 percent;
   chromium, in a range of about 4.0 percent to about 5.0 percent;
   rhenium, in a range of about 1.6 percent to about 2.0 percent;
   platinum, in a range of about 0.8 percent to about 1.4 percent;
   hafnium, in a range of about 0.20 percent to about 0.40 percent;
   silicon, in a range of about 0.30 percent to about 0.60 percent;
   about 0.02 percent carbon;
   about 0.01 percent boron; and
   a balance of nickel,
   wherein the superalloy does not include molybdenum, does not include tungsten, and does not include cobalt.

2. The platinum-modified nickel-based superalloy of claim 1, further comprising, by weight, about 50 parts per million of yttrium.

3. The platinum-modified nickel-based superalloy of claim 1, further comprising, by weight, about 50 parts per million of lanthanum.

4. The platinum-modified nickel-based superalloy of claim 1, wherein the super-alloy comprises powder particles of a spherical shape.

5. The platinum-modified nickel-based superalloy of claim 4, wherein the spherical particles have an average diameter between about 45 micrometers and about 150 micrometers.

6. A method of repairing a damaged turbine engine component comprising a cracked portion, the method comprising the steps of:
applying a platinum-modified nickel-based superalloy onto and into the cracked portion of the turbine engine component to form a welded portion, the platinum-modified nickel-based superalloy comprising, by weight:
aluminum, in a range of about 7.8 percent to about 8.2 percent,
tantalum, in a range of about 5.0 percent to about 6.0 percent,
chromium, in a range of about 4.0 percent to about 5.0 percent,
rhenium, in a range of about 1.6 percent to about 2.0 percent,
platinum, in a range of about 0.8 percent to about 1.4 percent,
hafnium, in a range of about 0.20 percent to about 0.40 percent,
silicon, in a range of about 0.30 percent to about 0.60 percent,
about 0.02 percent carbon,
about 0.01 percent boron,
about 50 parts per million of yttrium,
about 50 parts per million of lanthanum, and
a balance of nickel,
wherein the superalloy does not include molybdenum, does not include tungsten, and does not include cobalt; and
performing a post-deposition step on the turbine engine component.

7. A repaired turbine engine component comprising:
a substrate comprising a first alloy comprising a cracked portion therein; and
a welded portion on the substrate that is welded onto and into the cracked portion, the welded portion comprising a second alloy that is different in formulation from the first alloy and comprises, by weight:
aluminum, in a range of about 7.8 percent to about 8.2 percent;
tantalum, in a range of about 5.0 percent to about 6.0 percent;
chromium, in a range of about 4.0 percent to about 5.0 percent;
rhenium, in a range of about 1.6 percent to about 2.0 percent;
platinum, in a range of about 0.8 percent to about 1.4 percent;
hafnium, in a range of about 0.20 percent to about 0.40 percent;
silicon, in a range of about 0.30 percent to about 0.60 percent;
about 0.02 percent carbon;
about 0.01 percent boron; and
a balance of nickel,
wherein the second alloy does not include molybdenum, does not include tungsten, and does not include cobalt.

8. The turbine engine component of claim 7, wherein the second alloy further comprises about 50 parts per million of yttrium.

9. The turbine engine component of claim 7, wherein the second alloy further comprises about 50 parts per million of lanthanum.

10. The turbine engine component of claim 7, wherein the second alloy further comprises about 50 parts per million yttrium and about 50 parts per million of lanthanum.

11. The turbine engine component of claim 7, wherein the second alloy further comprises about 50 parts per million of yttrium.

12. The turbine engine component of claim 7, wherein the second alloy further comprises about 50 parts per million of lanthanum.

13. The turbine engine component of claim 7, wherein the second alloy further comprises about 50 parts per million yttrium and about 50 parts per million of lanthanum.

14. The turbine engine component of claim 7, wherein the cracked portion comprises a wedge crack extending below a tip cap or a build-up of a tip surface over the substrate.

15. The turbine engine component of claim 14, wherein the first alloy is a nickel-based superalloy selected from the group consisting of: IN792, C101, MarM247, Rene80, Rene125, ReneN5, SC180, CMSX 4, and PWA1484.

16. The turbine engine component of claim 15, further comprising a protective coating system disposed over the welded portion, the protective coating system comprising a bond coating in direct physical contact with the welded portion, a thermally grown oxide disposed over the bond coating, and a thermal barrier coating disposed over the thermally grown oxide.

17. The turbine engine component of claim 16, wherein the bond coating comprises a diffusion aluminide coating, wherein at least a portion of the diffusion aluminide coating is metallurgically diffused into a portion of both the substrate and the welded portion.

18. The turbine engine component of claim 17, wherein the diffusion aluminide coating comprises at least one additional metal layer selected from the group consisting of: a platinum layer, a hafnium and/or a zirconium layer, or a co-deposited hafnium, zirconium, and platinum layer, wherein the at least one additional metal layer is metallurgically diffused into the portion of both the substrate and the welded portion.

19. The turbine engine component of claim 18, wherein the bond coating has a thickness in a range of from about 25 μm to about 150 μm.

20. The turbine engine component of claim 19, wherein the thermal barrier coating comprises a stabilized zirconia ceramic material.

* * * * *